United States Patent Office

2,844,558
Patented July 22, 1958

2,844,558

DIALKENYL BETA - CYANOETHANEPHOSPHONATE AND POLYMERS AND COPOLYMERS THEREOF

Arthur Dock Fon Toy and Robert S. Cooper, Park Forest, Ill., assignors to Victor Chemical Works, a corporation of Illinois No Drawing. Application September 22, 1953
Serial No. 381,765

16 Claims. (Cl. 260—45.4)

This invention relates to dialkenyl beta-cyano-ethanephosphonate and polymers and copolymers thereof.

We have found that in the presence of sodium alkenolates the di beta, gamma alkenyl phosphites will react with acrylonitrile to produce di beta, gamma alkenyl beta-cyanoethanephosphonate esters. These new ester compounds are useful in the flameproofing of fabrics, and may be polymerized to form hard, tough, flame-resistant films, coatings and molded solid products.

The dialkenyl phosphites which may be employed include the diallyl and dimethallyl esters and may be illustrated by the formula:

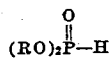

where R is a beta, gamma unsaturated radical of the formula:

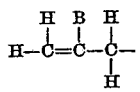

where B represents hydrogen and methyl groups. Preferably we employ the diallyl phosphite ester because of its more ready availability.

The reaction involved in the preparation of our new ester products may be illustrated by the equation:

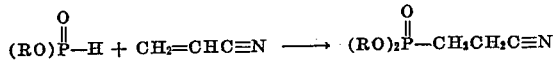

where R is the alkenyl group described above.

The ester reaction products, particularly the diallyl esters, are clear, viscous liquids which may be used in the preparation of flameproof films and coating for wood, fabrics, etc. The liquid esters may be polymerized in the presence of organic peroxides to give useful resin products ranging from viscous gels to tough, hard glass-like solids having excellent flame resisting characteristics. They may be copolymerized with other polymerizable monomers such as methyl methacrylate, vinyl acetate, diallyl phthalate, unsaturated polyesters, styrene, etc., to impart self-flame-extinguishing character to the resulting copolymer products.

*Example 1.*—Diallyl beta-cyanoethanephosphonate was prepared in accordance with the equation:

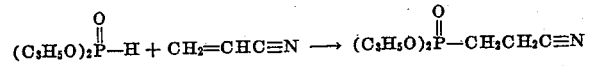

324.2 gms. (2.0 moles) of redistilled diallyl phosphite and 106.1 gms. (2.0 moles) of acrylonitrile were placed in a flask fitted with stirrer, thermometer and dropping funnel, and cooled to 20° C. in an ice-bath. A catalyst solution of sodium, prepared by dissolving 6.4 gms. of sodium in 100 gms. distilled allyl alcohol and 100 gms. of toluene, was added dropwise ot the reaction mixture at such rate that the temperature did not rise above 25° C. The reaction was complete after 54 minutes. 10 ml. of water was added and the solution saturated with $CO_2$ gas. Volatiles were stripped out to 113° C. at 1 mm.

(vapor temp.=85° C.) and the crude product filtered. 385 gms. (89.5% yield) of hazy but colorless crude diallyl beta-cyanoethanephosphonate were recovered, having an index of refraction $N_D^{25}=1.4662$. A five gram sample of the product was polymerized for 16 hours at 87° C. with 3% benzoyl peroxide and gave a hard, brittle, clear amber colored resin.

*Example 2.*—One mole (53.1 grams) of distilled acrylonitrile and 162.1 grams (1 mole) of distilled diallyl phosphite were placed in a flask fitted with stirrer, thermometer, and dropping funnel. A catalyst solution (prepared by dissolving 12 grams sodium in 300 ml. allyl alcohol and 200 ml. toluene below 25° C.) was added dropwise at such rate that the reaction temperature was maintained at about 30–35° C. for 35 minutes. After the reaction was completed, the mixture was stirred for about 30 minutes, 3 ml. of water added, and the mixture saturated with $CO_2$ gas. The mixture was then filtered, stripped of volatiles to 100° C. at 1 mm. pressure and refiltered. The crude product was then distilled giving an 81% yield of a liquid diallyl beta-cyanoethanephosphonate having an index of refraction $N_D^{25}=1.4640$. On heating a 5 gram sample for 16 hours with 3% benzoyl peroxide at 85° C. the product polymerized to a hard tough, clear amber-colored resin.

In several examples an acrylonitrile containing a small amount of trinitrobenzene as a polymerization inhibitor was employed without materially affecting the reaction conditions or the product yields.

*Example 3.*—Dimethallyl beta-cyanoethanephosphonate.

216.4 grams (1.14 moles) of dimethallyl phosphite and 60.5 grams (1.14 moles) of acrylonitrile were mixed together in a reaction vessel and a solution of sodium in methallyl alcohol added dropwise at such rate that the reaction temperature was maintained at about 30 to 35° C. The reaction took 57 minutes. After stirring for 30 minutes, 5 ml. of water was added and the mixture saturated with $CO_2$ gas. The volatiles were stripped off to 110° C. at 3 mm. pressure and the crude product fractionated. A 193 gram fraction boiling at 130–140° C. at ½ mm. pressure was separated and further purified by stirring with 100 grams of a 10% aqueous solution of $NaHCO_3$ at 55–60° C. The aqueous layer was separated and the organic layer stripped of volatiles to 100° C. at 1 mm. pressure. After filtration, the product was distilled yielding 156.9 grams (57%) of dimethallyl beta-cyanoethanephosphonate having an index of refraction $N_D^{25}=1.4653$, a boiling point of 122–127° C. at ½ mm., an acidity of 0.02 ml. of 0.1 N NaOH/gram, and a phosphorus content of 12.9% compared to the calculated value of 12.5%.

A 5 ml. sample with 3% benzoyl peroxide was heated 16 hours at 85° C., yielding a hard, tough, clear yellow solid resin. This polymer, however, was not sufficiently flame resistant to be self-extinguishing, although it may be employed in copolymers with other polymerizable compounds to effect self-flame-extinguishing characteristics in such copolymers. For example, when 10 parts of dimethallyl B-cyanoethanephosphonate is copolymerized with 90 parts of vinyl acetate, the resulting copolymer after ignition, will be self-extinguishing within 2 seconds whereas neither of the components when polymerized alone is self-extinguishing.

We have described that the above esters may be co polymerized with a number of known polymerizabl compounds such as methyl methacrylate, diallyl phthal ate, unsaturated polyesters, vinyl acetate, styrene, etc to produce useful solid resin products having flame re sistance and other desirable characteristics.

The copolymerization may be effected by heating the desired mixtures in the presence of a polymerization

Table I

| Percent, Parts by wt. | Phosphonate | Percent, Parts by wt. | Monomer | Percent, Benzoyl Peroxide | Curing Cycle | Physical Character | Burning Time (seconds) |
|---|---|---|---|---|---|---|---|
| 15 | Diallyl beta-cyanoethanephosphonate. | 85 | Methyl Methacrylate. | 0.16 | 24 hrs. at 70° C., 4 hrs. at 85° C. | Hard, tough, light yellow solid | >15 |
| 20 | ----do---- | 80 | ----do---- | .18 | ----do---- | ----do---- | 5 |
| 25 | ----do---- | 75 | ----do---- | .20 | ----do---- | Hard, tough, straw color, sl. hazy solid | 3 |
| 30 | ----do---- | 70 | ----do---- | .22 | ----do---- | ----do---- | 2 |
| 35 | ----do---- | 65 | ----do---- | .25 | ----do---- | Hard, tough, yellow color, sl. hazy solid | 5 |
| 50 | ----do---- | 50 | ----do---- | .50 | ----do---- | Hard, tough, light amber color, sl. hazy solid | 4 |
| 70 | ----do---- | 30 | ----do---- | 1.20 | ----do---- | Hard, tough, light amber color, clear solid | 1 |
| 90 | ----do---- | 10 | ----do---- | 2.50 | ----do---- | ----do---- | 2 |
| 10 | ----do---- | 90 | Diallyl Phthalate. | 2.50 | 20 hrs. at 85° C. | Hard, tough, yellow color, clear solid | 2 |
| 15 | ----do---- | 85 | ----do---- | 2.50 | 16 hrs. at 85° C. | ----do---- | <1 |
| 20 | ----do---- | 80 | ----do---- | 2.50 | ----do---- | Hard, tough, light amber color, clear solid | 2 |
| 30 | ----do---- | 70 | ----do---- | 2.50 | ----do---- | Hard, tough, amber color, clear solid | 2 |
| 50 | ----do---- | 50 | ----do---- | 2.50 | ----do---- | ----do---- | 2 |
| 70 | ----do---- | 30 | ----do---- | 2.50 | ----do---- | ----do---- | 2 |
| 90 | ----do---- | 10 | ----do---- | 2.50 | 40 hrs. at 70° C. | Hard, tough, light yellow color, clear solid | >15 |
| 15 | ----do---- | 85 | Unsaturated Polyester (Laminac 4201). | 0.50 | 20 hrs. at 70° C. | ----do---- | 2 |
| 20 | ----do---- | 80 | ----do---- | .60 | ----do---- | Hard, tough, light amber color, clear solid | 3 |
| 30 | ----do---- | 70 | ----do---- | .80 | ----do---- | ----do---- | 2 |
| 50 | ----do---- | 50 | ----do---- | 1.50 | ----do---- | ----do---- | 2 |
| 70 | ----do---- | 30 | ----do---- | 1.50 | 20 hrs. at 70° C., 4 hrs. at 85° C. | ----do---- | 2 |
| 90 | ----do---- | 10 | ----do---- | 2.50 | 20 hrs. at 70° C. | ----do---- | 3 |
| 10 | ----do---- | 90 | Vinyl Acetate. | 0.20 | 24 hrs. at 70° C. | Hard, tough, colorless, almost clear solid | 6 |
| 20 | ----do---- | 80 | ----do---- | .50 | 20 hrs. at 70° C. | Hard, tough, light straw color, sl. hazy solid | 3 |
| 30 | ----do---- | 70 | ----do---- | .80 | ----do---- | Hard, tough, light yellow color, sl. hazy solid | 7 |
| 50 | ----do---- | 50 | ----do---- | .90 | ----do---- | Hard, tough, golden color, clear solid | 1 |
| 70 | ----do---- | 30 | ----do---- | 2.00 | ----do---- | Hard, tough, light amber color, clear solid | 2 |
| 90 | ----do---- | 10 | ----do---- | 2.50 | ----do---- | Hard, tough, amber color, clear solid | >15 |
| 10 | ----do---- | 90 | Styrene | 0.10 | 24 hrs. at 70° C., 40 hrs. at 78° C., 4 hrs. at 85° C. | Hard, tough, light yellow, translucent solid | 12 |
| 15 | ----do---- | 85 | ----do---- | 0.12 | ----do---- | Hard, tough, light yellow, opaque solid | 4 |
| 20 | ----do---- | 80 | ----do---- | .14 | ----do---- | ----do---- | 2 |
| 25 | ----do---- | 75 | ----do---- | .16 | ----do---- | ----do---- | 2 |
| 30 | ----do---- | 70 | ----do---- | .18 | ----do---- | ----do---- | 2 |
| 35 | ----do---- | 65 | ----do---- | .20 | ----do---- | ----do---- | 1 |
| 50 | ----do---- | 50 | ----do---- | .25 | ----do---- | Separated into layers | |

Table II

| Percent, Parts by wt. | Phosphonate | Percent, Parts by wt. | Monomer | Percent, Benzoyl Peroxide | Curing Cycle | Physical Character | Burning Time (seconds) |
|---|---|---|---|---|---|---|---|
| 15 | Dimethallyl beta-cyanoethanephosphonate. | 85 | Methyl Methacrylate. | 0.16 | 24 hrs. at 70° C. | Hard, tough, colorless, almost clear solid | >15 |
| 20 | ----do---- | 80 | ----do---- | .18 | ----do---- | Hard, tough, light straw, almost clear solid | >15 |
| 25 | ----do---- | 75 | ----do---- | .20 | ----do---- | ----do---- | >15 |
| 30 | ----do---- | 70 | ----do---- | .22 | ----do---- | Hard, tough, straw color, clear solid | 4 |
| 50 | ----do---- | 50 | ----do---- | .50 | ----do---- | Hard, tough, yellow color, clear solid | >15 |
| 70 | ----do---- | 30 | ----do---- | 1.20 | ----do---- | ----do---- | >15 |
| 90 | ----do---- | 10 | ----do---- | 2.50 | ----do---- | ----do---- | >15 |
| 10 | ----do---- | 90 | Diallyl Phthalate. | 2.50 | 20 hrs. at 85° C. | ----do---- | 3 |
| 15 | ----do---- | 85 | ----do---- | 2.50 | ----do---- | Hard, tough, golden color, clear solid | 1 |
| 25 | ----do---- | 75 | ----do---- | 2.50 | ----do---- | ----do---- | 2 |
| 50 | ----do---- | 50 | ----do---- | 2.50 | 20 hrs. at 70° C., 20 hrs. at 85° C. | Hard, tough, light amber color, clear solid | 1 |
| 70 | ----do---- | 30 | ----do---- | 2.70 | ----do---- | ----do---- | 7 |
| 90 | ----do---- | 10 | ----do---- | 2.90 | ----do---- | ----do---- | >15 |
| 15 | ----do---- | 85 | Unsaturated Polyester (Laminac 4201). | 0.50 | 20 hrs. at 70° C., 20 hrs. at 85° C. | Hard, tough, light yellow color, clear solid | 10 |
| 20 | ----do---- | 80 | ----do---- | .60 | ----do---- | ----do---- | 2 |
| 30 | ----do---- | 70 | ----do---- | .80 | ----do---- | Hard, tough, golden yellow color, clear solid | 1 |
| 50 | ----do---- | 50 | ----do---- | 1.50 | 20 hrs. at 70° C., 4 hrs. at 85° C. | ----do---- | 2 |
| 70 | ----do---- | 30 | ----do---- | 1.50 | ----do---- | ----do---- | >15 |
| 90 | ----do---- | 10 | ----do---- | 2.50 | ----do---- | ----do---- | >15 |
| 10 | ----do---- | 90 | Vinyl Acetate. | 0.20 | 24 hrs. at 70° C. | Hard, tough, colorless, clear solid | 2 |
| 15 | ----do---- | 85 | ----do---- | .30 | ----do---- | Hard, tough, almost colorless, clear solid | 1 |
| 20 | ----do---- | 80 | ----do---- | .50 | ----do---- | Hard, tough, light straw color, clear solid | 2 |
| 25 | ----do---- | 75 | ----do---- | .60 | ----do---- | ----do---- | 3 |
| 50 | ----do---- | 50 | ----do---- | 1.50 | ----do---- | Hard, tough, yellow color, clear solid | 2 |
| 70 | ----do---- | 30 | ----do---- | 2.00 | ----do---- | Hard, tough, golden color, clear solid | >15 | catalyst such as the organic peroxy compounds, benzoyl peroxide, acetyl peroxide, tertiary-butyl prebenzoate, etc. The copolymerization may be carried out with mixtures of the monomers in bulk, in a suitable solvent, or in an emulsion polymerization system.

A typical copolymerization procedure is illustrated in the following examples:

Example 4.—Diallyl beta - cyanoethanephosphonate (index of refraction $N_D^{25}$=1.4652, acidity 0.01 ml. 0.1 N NaOH/gram) was mixed with an equal weight of methyl methacrylate and 0.5% of benzoyl peroxide, and the mixture heated in a glass container for 16 hours at 85° C. yielding a hard, tough, light amber colored solid resin.

Example 5.—Dimethallyl beta - cyanoethanephosphonate (index of refraction $N_D^{25}$=1.4653, boiling point 122–127° C. at 0.5 mm. pressure) was mixed with Laminac No. 4201 (partially polymerized unsaturated polyester such as generally described in U. S. Patent No. 2,443,736, containing an alkenyl aryl cross-linking agent, such as diallyl phthalate, and the reaction product of an alpha, beta ethylenically unsaturated polycarboxylic acid, such as maleic or fumaric acid, a saturated polycarboxylic acid free of non-benzoid unsaturation, such as phthalic acid, and at least one glycol, such as ethlyene glycol and/or diethylene glycol), produced by American Cyanamid Company, in the proportions of 3 parts to 7 parts by weight, and 0.8% benzoyl peroxide added. The mixture was heated for 20 hours at 70° C. and 20 hours at 85° C. The resulting copolymer was a hard, tough, clear, golden-colored solid having excellent self-flame-extinguishing qualities.

A number of other copolymerizations were made with varying proportions of the monomers and amounts of polymerization catalysts. The conditions employed in these tests and the characteristics of the resulting copolymer resins are shown in Tables I and II.

The flammability tests were made by burning an irregular piece of the solid copolymer (approximately ¼" in diameter) for 15 seconds in a 1½ inch blue flame, then removing the flame and determining the time required for the resin to stop burning. The burning time reported in the tables is the maximum obtained in three trials. A burning time of less than 15 seconds is considered illustrative of the self-flame-extinguishing character of the resin.

From the proportions shown in Table I it is seen that hard, tough solid copolymer resin products may be obtained when the diallyl beta-cyanoethanephosphonate is employed in proportions of at least 10% of starting mixture. Copolymers with styrene shown in Table I illustrate satisfactory, though opaque resin products when the copolymer contains less than 50% of the phosphonate.

As shown in Table II, the copolymerization of dimethallyl beta-cyanoethanephosphonate with other monomers produces useful, hard, tough solid resins with proportions ranging from 10 to 90% of the phosphonate.

Reference is also made to the copending applications of A. D. F. Toy, R. S. Cooper, and T. P. Traise, Serial No. 381,761, filed September 22, 1953, now Patent No. 2,761,049; J. R. Costello, Jr. and T. P. Traise, Serial No. 381,762, filed September 22, 1953, now Patent No. 2,680,471.

The foregoing detailed description has been given for clearness of understanding only, and no unnecessary limitations should be understood therefrom, for modifications will be obvious to those skilled in the art.

We claim:

1. As a new compound, diallyl beta-cyanoethanephosphonate.
2. As a new compound, dimethallyl beta-cyanoethanephosphonate.
3. A di beta, gamma alkenyl beta-cyanoethanephosphonate having the formula:

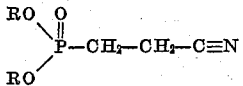

wherein the "R" groups are the same and a member of the class consisting of allyl and methallyl radicals.

4. A di beta, gamma alkenyl beta-cyanoethanephosphonate wherein the alkenyl substituents contain at least 3 carbon atoms and not more than 4 carbons.
5. A solid polymer of diallyl beta-cyanoethanephosphonate.

6. A solid polymer of dimethallyl beta-cyanoethanephosphonate.
7. A copolymer of a di beta, gamma alkenyl beta-cyanoethanephosphonate having the formula:

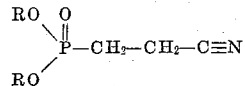

where R is a member of the class consisting of allyl and methallyl radicals, and a monomer polymerizable therewith.

8. A copolymer of about 10%–90% by weight of diallyl beta-cyanoethanephosphonate and about 90%–10% of a monomer polymerizable therewith.
9. A copolymer of about 10%–90% by weight of diallyl beta-cyanoethanephosphonate and about 90%–10% of methyl methacrylate.
10. A copolymer comprising: a di beta, gamma alkenyl beta-cyanoethanephosphonate wherein the alkenyl substituents contain at least 3 carbon atoms and not more than 4 carbon atoms; and a monomer polymerizable therewith.
11. A copolymer of diallyl beta-cyanoethanephosphonate and a monomer polymerizable therewith.
12. A copolymer of dimethallyl beta-cyanothanephosphonate and a monomer polymerizable therewith.
13. A copolymer of a di beta, gamma alkenyl beta-cyanoethanephosphonate having the formula:

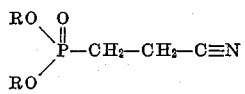

wherein the "R" groups are the same and a member of the class consisting of allyl and methallyl radicals, and a monomer polymerizable therewith.

14. The copolymer of claim 13 wherein the proportion of the phosphonate is from about 10%–90% by weight of the copolymer.
15. A copolymer of a di beta, gamma alkenyl beta-cyanoethanephosphonate having the formula:

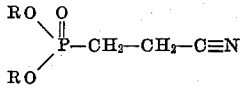

wherein the "R" groups are the same and a member of the class consisting of allyl and methallyl radicals, and a polymerizable member of the group consisting of methyl methacrylate, diallyl phthalate, styrene, vinyl acetate, and a partially polymerized unsaturated polyester containing an alkenyl-aryl cross-linking agent and the reaction product of an alpha, beta ethylenically unsaturated polycarboxylic acid, a saturated polycarboxylic acid free of non-benzoid unsaturation and at least one glycol.

16. A copolymer of dimethallyl beta-cyanoethanephosphonate and a partially polymerized unsaturated polyester containing an alkenyl aryl cross-linking agent and the reaction product of an alpha, beta ethylenically unsaturated polycarboxylic acid, a saturated polycarboxylic acid free of non-benzoid unsaturation and at least one glycol.

References Cited in the file of this patent

UNITED STATES PATENTS 2,668,800    Johnston _____ Feb. 9, 1954

FOREIGN PATENTS 134,280    Sweden _____ Jan. 22, 1952

UNITED STATES PATENT OFFICE

CERTIFICATE OF CORRECTION

Patent No. 2,844,558                                              July 22, 1958

Arthur Dock Fon Toy et al.

It is hereby certified that error appears in the printed specification of the above numbered patent requiring correction and that the said Letters Patent should read as corrected below.

Column 1, line 42, for $$\text{"(RO)}\overset{O}{\overset{\|}{P}}\text{-H"} \quad \text{read} \quad \text{--} \quad \text{(RO)}_2\overset{O}{\overset{\|}{P}}\text{-H} \quad \text{--}$$

line 68, for "ot" read -- to --; column 3, line 68, for "prebenzoate" read -- perbenzoate --; column 6, lines 25 and 26, for "beta-cyanothanephosphonate" read -- beta-cyanoethanephosphonate --.

Signed and sealed this 25th day of November 1958.

(SEAL)
Attest:

KARL H. AXLINE                                                       ROBERT C. WATSON
Attesting Officer                                                Commissioner of Patents